United States Patent [19]

Williams

[11] 3,995,595
[45] Dec. 7, 1976

[54] ANIMAL FEED DEVICE CONTAINING AN INSECTICIDAL CARTRIDGE

[76] Inventor: Robert W. Williams, 429 Cedar St., Lansdale, Pa. 19446

[22] Filed: Apr. 8, 1975

[21] Appl. No.: 566,133

Related U.S. Application Data

[63] Continuation-in-part of Ser. No. 460,688, April 15, 1974, abandoned.

[52] U.S. Cl. .............................. 119/61; 119/51 R
[51] Int. Cl.² .......................................... A01K 5/00
[58] Field of Search .......... 119/61, 106, 156, 51 R

[56] References Cited
UNITED STATES PATENTS

| | | | |
|---|---|---|---|
| 2,677,350 | 5/1954 | Prestidge et al. | 119/61 |
| 2,688,311 | 9/1954 | Pierce | 119/156 |
| 2,791,202 | 5/1957 | Doyle | 119/106 |
| 3,195,510 | 7/1965 | Bernstein | 119/61 |
| 3,687,114 | 8/1972 | Berkstresser | 119/106 |

*Primary Examiner*—J.N. Eskovitz
*Attorney, Agent, or Firm*—Joseph W. Molasky

[57] ABSTRACT

A feed tray, bowl or dining mat for animals which, in addition to serving as a receptacle for food, contains an insecticidal composition capable of maintaining the said tray, bowl or mat essentially free from insects.

18 Claims, 18 Drawing Figures

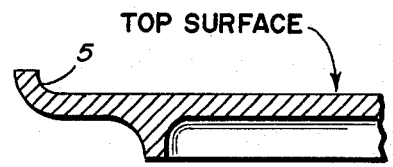
FIG. I
SECTION THRU RIB
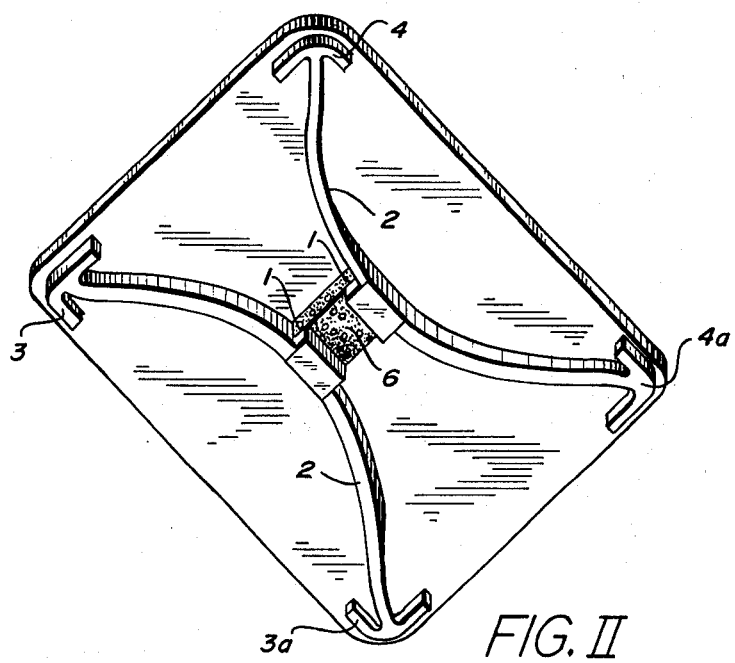
FIG. II
BOTTOM VIEW SHOWING SUGGESTED RIB CONSTRUCTION OF MOLDED TRAY
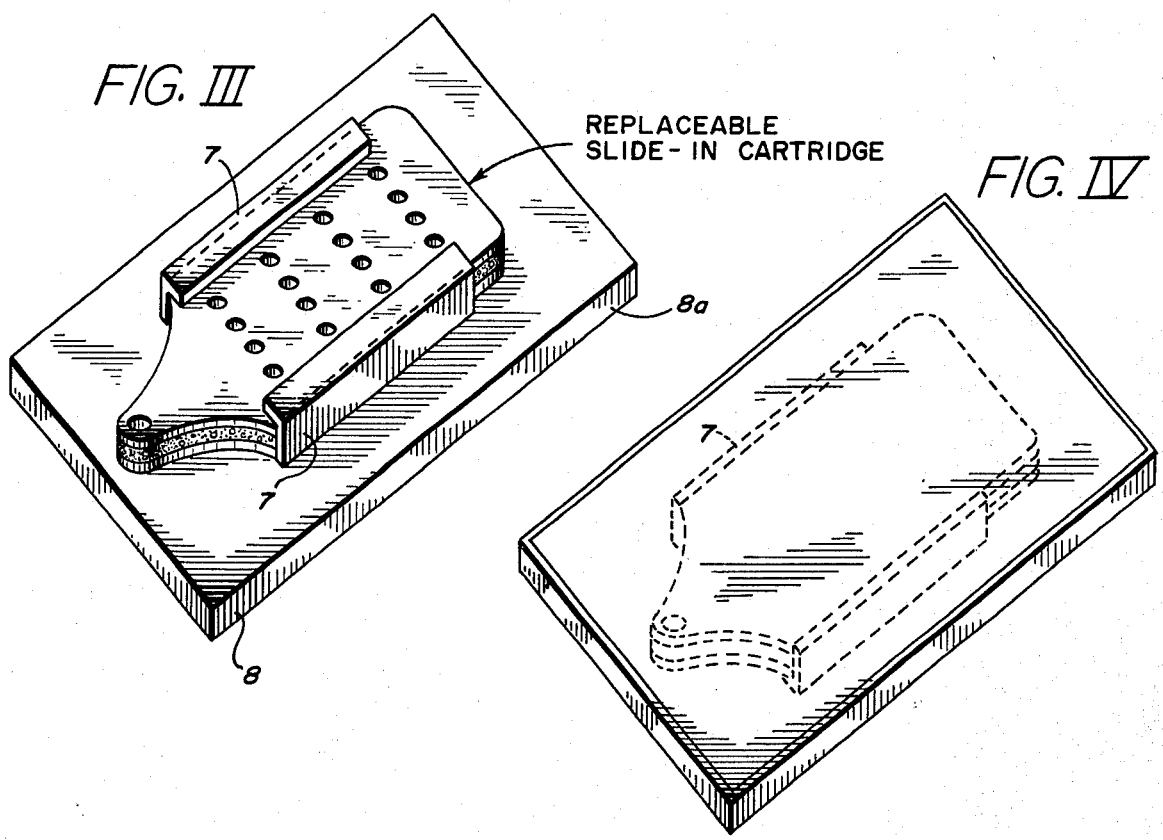
FIG. III
REPLACEABLE SLIDE-IN CARTRIDGE
FIG. IV

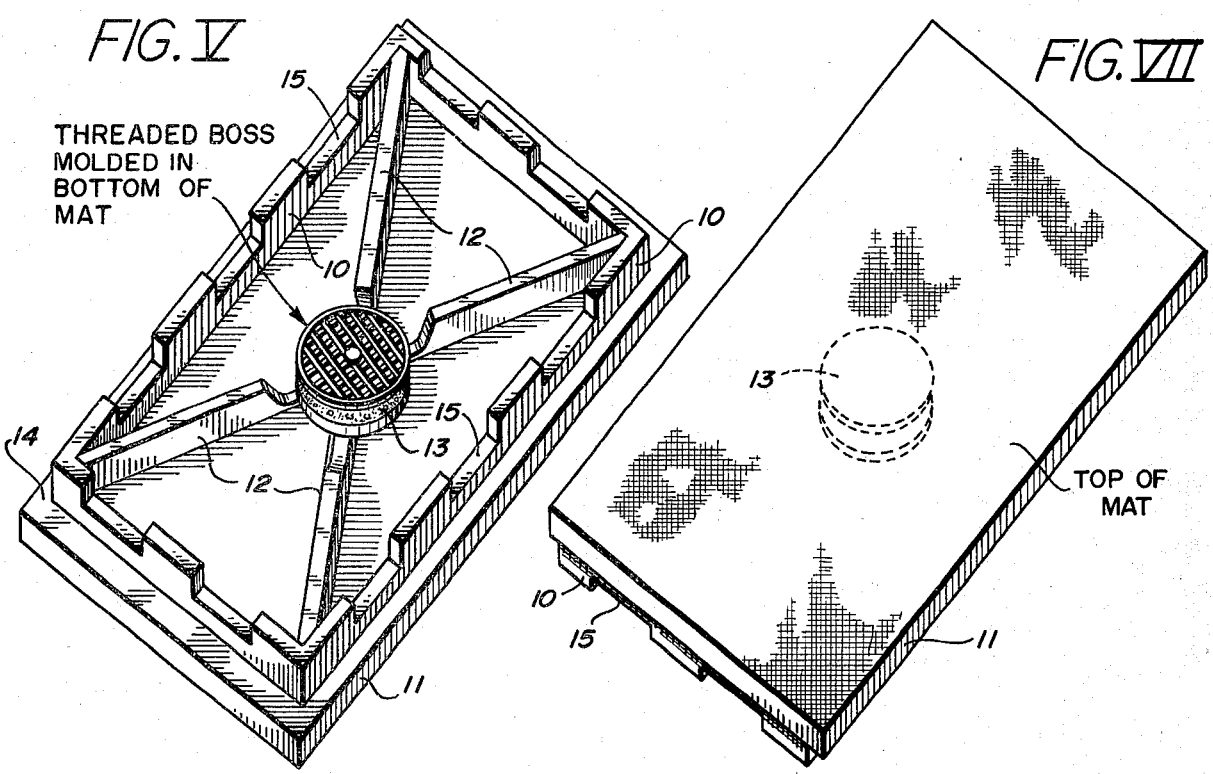
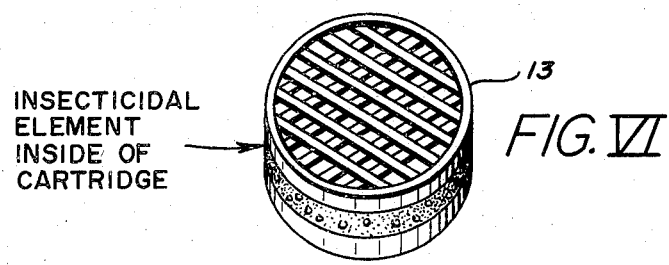
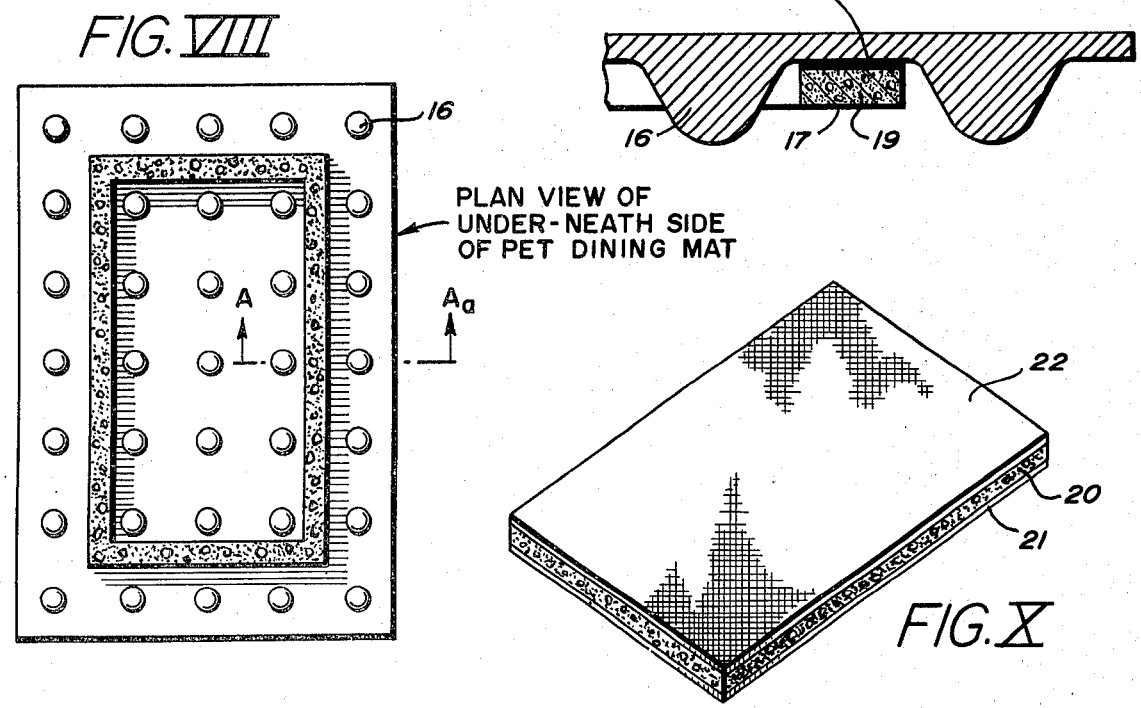

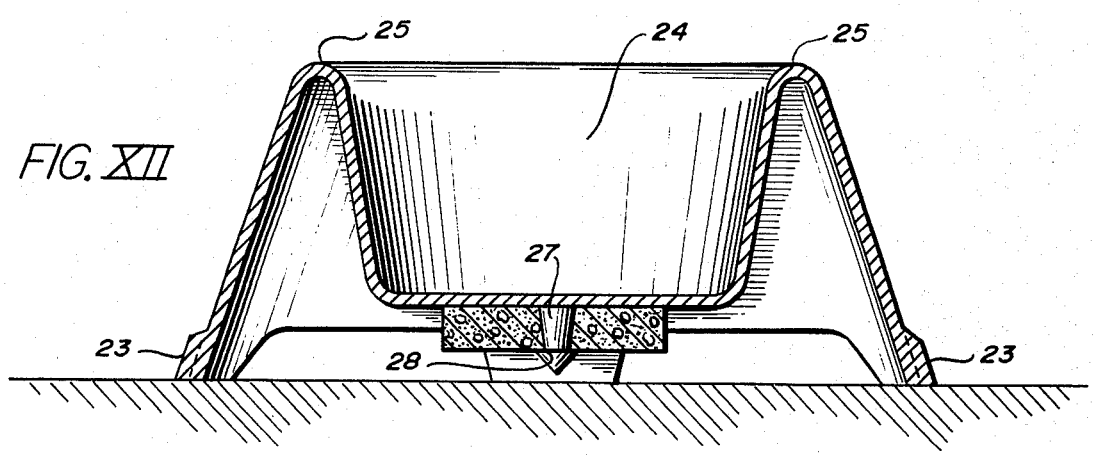
FIG. XII
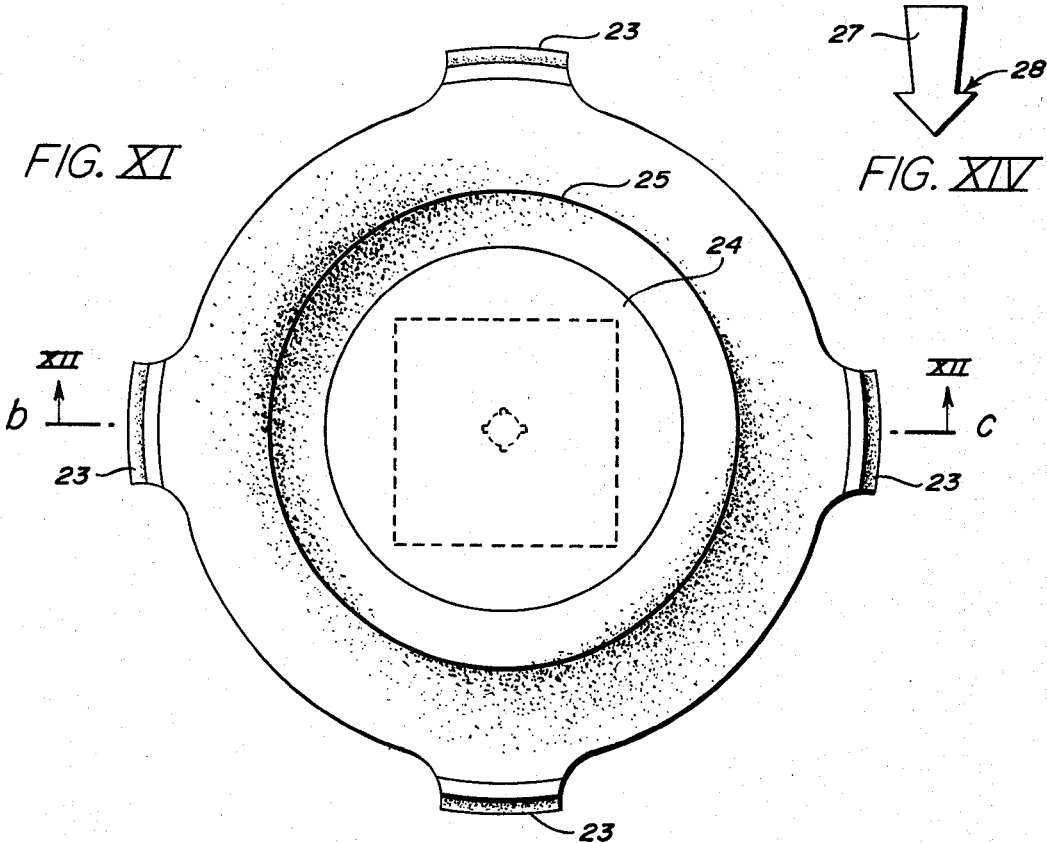
FIG. XI
FIG. XIV
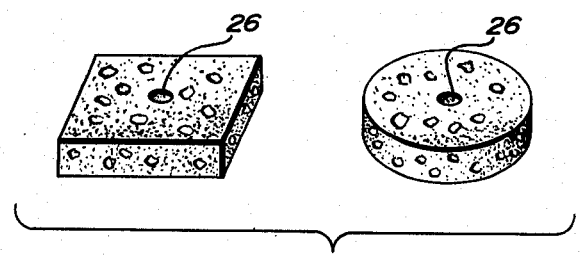
FIG. XIII

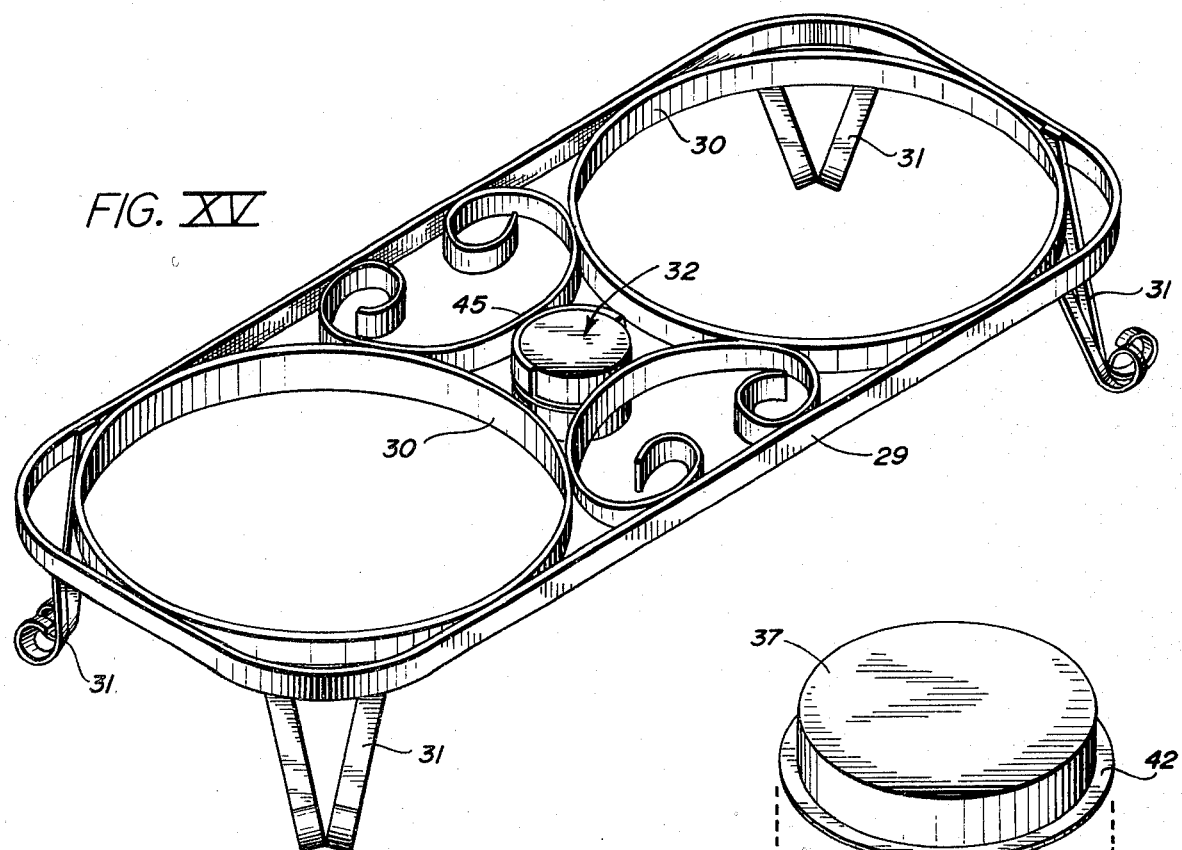
FIG. XV
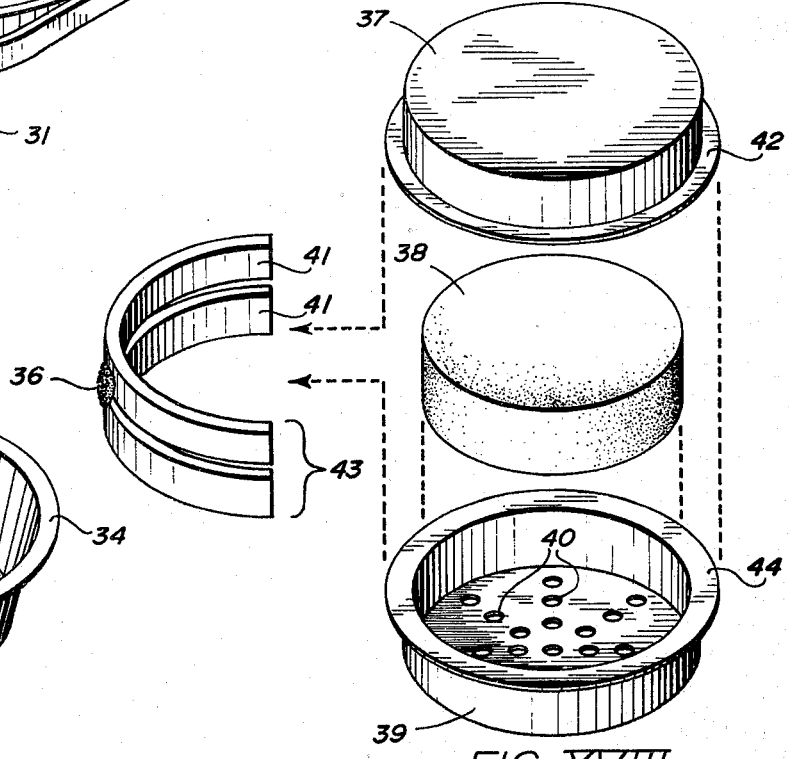
FIG. XVII
FIG. XVIII
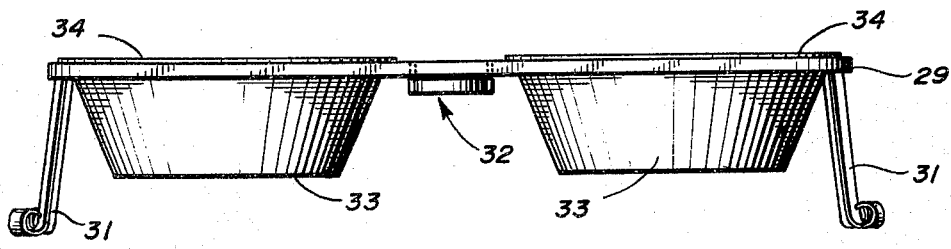
FIG XVI

ANIMAL FEED DEVICE CONTAINING AN INSECTICIDAL CARTRIDGE

This application is a Continuation-in-Part of applicant's copending application Ser. No. 460,688 filed Apr. 15, 1974 now abandoned.

This invention relates to a new device for the feeding of animals. Specifically, it covers a new type of food receptacle which combines the advantages of an animal feeder with the ability to maintain said receptacle or feeder relatively free from insects.

More specifically, this invention covers an animal feed receptacle designed in such a manner as to accommodate an insecticidal composition which can be replaced or regenerated once its effectiveness has been expended.

It is well known that the feeding of animals attracts flies, roaches, ants, silverfish and similar insect life and that such a condition is an annoyance to both said animals and to humans. This condition is particularly annoying in the case of domestic animals which are fed in or near the home, but obviously, this situation is not peculiar to household pets. Barnyard animals, for example, attract a wide variety of insects and, as in the case of domestic animals, this condition is especially annoying at mealtime when insects are attracted not only to the animal but to the feed.

In addition to their nuisance value, the presence of flies and insects usually results in an unsanitary condition. Disease-carrying insects are not uncommon and their attraction to animals and animal-feed can result in the transmission of bacteria to said animals and to humans with which they come in contact. Thus, in addition to the appeal of an insect-free environment, the present invention also has an health-promoting effect and, therefore, should have appeal to both pet lovers and those commercially engaged in the maintenance and/or the selling of livestock.

BACKGROUND

The concept of providing an insect-free environment for animals has long been a desire of pet owners and others engaged in the care and feeding or animals. This is particularly true in the case of pet owners because domesticated animals such as dogs and cats are often in or around the home and are frequently in the company of people whose sensibilities are offended by the presence of insects. This situation is aggravated at mealtime when the need for sanitary conditions is greatest.

One solution to this problem is the Ant-Proof Animal Food Tray of U.S. Pat. No. 2,677,350. That patent describes a feeding tray which is circumscribed by a trough filled with an insecticide for the purpose of setting up a physical barrier over which ants cannot pass in their quest for food.

The concept of U.S. Pat. No. 2,677,350 suffers from several drawbacks. It is inconvenient because it is necessary to maintain a minimum level of the insecticide in the trough at feeding times in order to effectively discourage ants from entering the tray.

Also, it is impractical because the insecticide lies in an open trough and, therefore, it is likely to become diluted, contaminated or dissipated by evaportion.

It is also bothersome to the extent that the insecticidal trough must be emptied when it is not being used, for safety's sake, so that it will not be available to children or ususpecting adults.

Also, there is the danger that the open insecticidal trough will somehow contaminate the food in the tray. It is a common experience to see animals scavenge for food and, therefore, it is to be expected that any morsels which fall outside of the feeding bowl and into the insecticidal liquid will be followed by the feeding animal where, in their contaminated state, they may be consumed by the unsuspecting animal. This danger is compounded by the more obvious fact that the insecticidal liquid within the open trough is capable of being spilled and this can result in direct contact with the feeding animal. Such an occurrence could result in the adverse effects commonly associated with insecticidal poisons, namely, a burning sensation, loss of hair, blindness or the like.

In addition, the prior art concepts fails to take note of the several varieties of insects which are attracted to food. While crawling insects such as ants may to a certain extend be discouraged from entering the food tray of U.S. Pat. No. 2,677,350, it cannot effectively repel winged or hopping insects such as ticks, fleas or flies and the like.

Furthermore, the prior art concepts does not provide for eliminating ants from the immediate vicinity of the feed area, but instead, only prevents them from entering the feed tray per se.

By contrast, applicant's invention is convenient, practical, effective and safe. The insecticidal cartridge which characterizes this invention not only discourages both crawling and winged insects from entering the food bowls but, in addition, it effectively repels them from the entire area of the feed tray by virtue of the insecticidal vapors which permeate the area in the vicinity of the feed bowl.

And because the insecticidal cartridge operates by vaporization, there is no likelihood of a purposeful or inadvertent contact with a harmful liquid.

Also, the insecticidal cartridge has an effective life of several weeks and, therefore, it does not require regeneration or the daily attention of the pet owner.

The instant invention is also safe. The insecticidal cartridge is housed beneath the tray and at no time comes in contact with the food or, in a preferred embodiment, with the feed bowls. In fact, the insecticide of this invention comes no closer to the food within the feed bowls than do the insecticidal compositions commonly used in commercial flea collars which, it should be noted, are constantly in the area of any food which is eaten by animals wearing such a device.

Thus, this invention is distinct from prior attempts to render animal feed areas free from insects and represents a significant advance in the art.

Construction:

This invention is best understood by reference to the drawings:

FIG. II is a bottom view of a molded tray with an insecticidal element.

FIG. I is a side view of one section of the molded tray of FIG. II.

FIG. III is a bottom view of a tray containing a slide-in insecticidal cartridge.

FIG. IV is a top view of FIG. III.

FIG. V is a bottom view of a tray with a threaded boss and containing a screw-on insecticidal element.

FIG. VI is a view of the insecticidal element depicted in the tray of FIG. V.

FIG. VII is a top view of the tray in FIG. V.

FIG. VIII is a bottom view of a tray containing an insecticidal tape element.

FIG. IX is a side view of a section of FIG. VIII.

FIG. X is a view of a dining mat containing an insecticidal element.

FIG. XI is a top view of a feed bowl.

FIG. XII is a cross-sectional view of the bowl of FIG. XI.

FIG. XIII sets forth two views of two insecticidal cartridges which are used in the feed bowl of FIG. XI.

FIG. XIV is a blowup view of a protrusion designed to hold the insecticidal cartridges of FIG. XIII.

FIG. XV is a two-bowl feed tray.

FIG. XVI is a side view of the feed tray of FIG. XV.

FIG. XVII is a diagonal view of a bowl which is used in the feed tray of FIG. XV.

FIG. XVIII is a view of the components comprising the insecticidal element in the tray of FIGS. XV and XVI.

The above Figures are described in detail in the following paragraphs and include an explanation of the reference numerals.

FIG. I is a side view of a molded tray having an angular rim or lip 5 which runs along the periphery of said tray and which serves to provide an effective means for maintaining any food or any food receptacle placed thereon. The surface of said tray may be smooth or designed but a ribbed of treaded surface is preferred since it alleviates or prevents any unnecessary movement in the food or food receptacle.

FIG. II is a view of the underside of the tray depicted in FIG. I illustrating one possible design for the tray supports or ribs 2. These supports 2, in addition to providing an evenly balanced tray, also serve to strengthen the said tray by virtue of their continuous construction running from corner 3 to corner 3a and from corner 4 to 4a. The indents or stepped elements 1 comprising the supports are constructed in such manner as to accommodate a suitably shaped insecticidal element 6, the composition of which will be discussed below. It is sufficient to say here that for the tray depicted in FIGS. I and II the insecticide 6 is, preferably, a solid composition premolded to fit snugly between the indents or stepped elements 4 comprising the supports 2. Alternatively, the insecticidal composition 6 can be housed within a perforated container costructed of metal, plastic or other suitable material and said container can itself be made to fit snugly between the said indents 4.

FIGS. III and IV are variations on the tray covered by FIGS. I and II. FIG. III is an underside view of a tray in which the indented supports 7 run parallel to each other and parallel to the outer edge 8 and 8a of said tray. The length of the indented supports 7 are not critical and, in general, their dimensions will depend largely upon the size of the insecticidal cartridge 9 which they are designed to accommodate.

FIG. IV is a top view of the tray covered by FIG. III with the dotted lines indicating the position of the indented supports 7 and insecticidal cartridge 9 housed beneath.

FIG. V is an underside view of still another tray covered by this invention. In this illustration the supports 10 are set off from the tray's edge 11 and run continuously around and beneath the said tray. Four ribs 12 extend from each corner of the supports 10 and converge upon a threaded boss 13 designed to accommodate the screw-on cartridge described in FIG. VI. It will be apparent to those skilled in the art that the supports 10, ribs 12 and boss 13 can be made of the same material as the tray 14 and that this design lends itself to one-press, single-unit construction. The cutouts 15 in the supports 10 are designed to permit the escape of the insecticidal vapors emanating from the cartridge (FIG. VI). The said cartridge may contain any one of the insecticidal compositions to be discussed infra and, preferably, has a webbed or preforated face with sized openings so as to allow for the vaporization of said insecticide.

FIG. VII is a top view of the tray depicted in FIG. V; it illustrates the utility of the supports 10 and the function of the cutouts 15 in permitting the uniform release of insecticidal vapors.

FIG. VIII is an underside view of still another tray within this invention and FIG. IX is a side view of the same tray along section A—Aa of FIG. VIII. In these two figures the said tray is supported by a plurality of evenly spaced knobs or legs 16 and the insecticide is contained in a tape element 17 which is either bonded to the underside of said tray or held thereto by an adhesive 18. Essentially, the tape 17 consists of an absorptive material such as gauze 19 which can be saturated with insecticide and which under normal conditions will release the insecticidal vapors by vaporization. Once the insecticidal composition has been dissipated the said tray (FIG. VIII) can be disposed of.

However, a preferred embodiment of this invention consists of either regenerating the tape element 17 or replacing it so as to restore the tray's insecticidal effectiveness. When, for example, the tape element 17 is bonded to the said tray and cannot be easily removed, it is most desirable to simply saturate the bonded tape with a solution of insecticide so as to effect regeneration, whereas, when said tape 17 is held to the tray by adhesive and can be removed, it is most convenient to simply replace same with a new tape element 17.

FIG. X is an illustration of a dining mat in which a spongeous element 20 is sandwiched between a non-skid base 21 and a smooth, ribbed or textured cover 22. The spongeous element 20 is so constituted as to be capable of absorbing an insecticidal solution and releasing same in vapor form over an extended period. Also, because of its simple construction and modest design and said mat (FIG. X) can be produced at relatively low cost and, therefore, can be manufactured and sold as a disposable item. However, in the interest of economy, the spongeous element 20 can also by regenerated by simply applying to said element any one of the insecticidal compositions set forth below.

The bowl of FIG. XI represents a preferred embodiment of this invention. FIG. XI is a top view of said bowl wherein 23 indicates the legs or supports for same. FIG. XII is a cross-sectional view of the bowl in FIG. XI along the plane b–c. According to this embodiment the bowl (FIGS. XI and XII) is of single unit construction and is characterized by a central cavity 24 into which the animal feed can be deposited. The said cavity 24 is ringed at its upper extremity by a rim 25 and said cavity is of such depth as to accommodate either large or small servings while at the same time minimizing the likelihood of spillage.

The insecticidal material or cartridges which can be used in conjuction with the bowl of FIG. XI are depicted in FIG. XIII. The said cartridges are comprised of an absorbent material which is natural or synthetic in origin and which contains an aperture 26 through its epicenter. The shape of this cartridge (FIG. XIII) is not critical but its dimensions must be such as to allow it to fit beneath the bowl (FIG. XII) and above the surface upon which the said bowl is placed. Preferably, the cartridge (FIG. XIII) is no larger in size than about 1/3 the diameter of the bowl (FIG. XII). Thus, according to one embodiment of this invention, in a bowl measuring nine inches in diameter the said cartridge would measure about 3 inches square or, in the case of a circular-shaped cartridge, 3 inches in diameter. The composition or origin of the cartridge and the chemical nature of the insecticidal composition will be discussed in greater detail in the following paragraphs.

The cartridges of FIG. XIII are supported beneath the bowl (FIG. XII) by protrusion 27. The said protrusion is designed to pass frictionally through aperture 26 of the cartridge (FIG. XIII) whereupon the circumferential flange 28 also acts to support said cartridge by gravity. The circumferential flange 28 of protrusion 27 is shown in greater detail in FIG. XIV.

The trays or dining mats depicted in FIGS. I-V and VII-X and the bowl of FIGS. XI and XII may be constructed of any suitable material as, for example, from a plastic comprising homopolymers, copolymers or thermosetting resins or of wood, glass, clay, pressed paper, leather, rubber of the natural or synthetic variety or a metal of the ferrous or non-ferrous type such as aluminum or various alloys comprising iron.

An especially preferred embodiment is illustrated by the feed tray of FIGS. XV and XVI. This tray is constructed of metal stripping, that is, wrought iron in which the various parts are joined to one another by spot welding, soldering or other suitalbe means. The surface of said tray is rectangular in shape owing to a continuous rectangular strip 29 which circumscribes its entire perimeter. Within this perimeter are two adjacent bowl openings defined by circular strips 30 (FIG. XV). These openings are designed to accommodate feed bowls 33 of the type depicted in FIGS. XVI and XVII.

The feed tray (FIG. XV) is supported by legs 31 jointed to each corner of rectangular strip 29. The precise shape of the said legs is not critical to this invention and, in practice, instead of the dual-leg design shown in FIGS. XV and XVI (31) it is sufficient to employ a single-leg fashioned from a single piece of wrought iron.

The insecticidal element 32 in this tray (FIGS. XV and XVI) is held between the two adjacent bowl openings by joining it to brace 45 (FIG. XV) by any suitable means as, for example, by a weld or a nut and bolt or the like.

The insecticidal element 32 consists essentially of the items depicted in FIG. XVIII, namely:
 a. the cartridge holder 43,
 b. a container consisting of top 37 and a bottom 39 perforated with holes 40; and
 c. an insecticidal cartouche 38 which fits within the said container.

The cartridge holder 43 consists of two semi-circular metal bands 41 imposed one over the other but separated slightly from each other and held together by weld 36. The opening or space between the said bands 41 is roughly equivalent to the combined thickness of the two rims (42 and 44) which circumscribe the top 37 and the bottom 39. This distance between bands 41 is critical to the extent that it must provide sufficient space for frictionally engaging the combined thickness of rims 42 and 44 when they have been superimposed one upon the other to form the container for the cartouche 38.

This frictional engagement occurs by sliding the superimposed rims 42 and 44 into the opening between metal bands 41.

The cartouche 38 is identical in composition to the cartridge of FIG. XIII; however, unlike the latter it does not contain an aperature 26. Thus, the cartouche consists essentially of an absorbent material impregnated with insecticide. Prior to use in the feed tray (FIGS. XV and XVI), it is desirable to maintain the cartouche in aluminum foil or in a paper or plastic wrap so as to prevent the insecticidal vapors from escaping to the atmosphere. In this way, the cartouche can be stored over a substantial period of time without any appreciable loss of its insecticidal effectiveness.

In practice, the feed tray (FIGS. XV and XVI) is utilized by simply unwrapping the insecticidal cartouche 38 and placing it in the container which results from superimposing top 37 upon bottom 39. This container is then placed between bands 41 in the feed tray. Thus equipped, the feed tray will not only serve as a feeder for animals but will also serve to effectively repel various insects from the immediate area of the said tray and thus maintain an essentially insect-free environment.

The framework for the tray of FIGS. XV and XVI is constructed of commonly available wrought iron which measures from about 1/2 inch to 3/16 inches in thickness and from about 5/8 inches to 1/4 inch in width. Wrought iron which meets these specifications is capable of being suitably shaped to form the instant tray (FIG. XV) without any sacrifice in strength or durability.

The various parts of the tray are joined to one another by any suitable means but, in practice, it is most desirable to spot weld them because in addition to providing an essentially permanent jointure it affords a finished appearance which need not be improved upon to make it attractive. The resulting tray can then be spray-painted or antiqued by conventional means so as to protect its surface and enhance its appearance.

The feed bowls 33 can be any suitably shaped container. It is only necessary that the said bowls be of such size as to fit the openings provided by circular strips 30. In addition, it is essential that the said bowl contain a rim 34 of sufficient size as to maintain it comfortably within the bowl openings in the tray. FIG. XVII depicts one bowl which has been found to be most suitable for use with this invention but, as a practical matter, any bowl which would serve the same purpose could be substituted therefor. The bowl 33 may be made of metal, plastic or other suitable material but from a practical and esthetic standpoint, it has been found most desirable to use a "Dutch" bowl of the stainless steel variety. In addition to a flat bottom such a bowl has a moderately sized rim 34 and thus provides the support necessary to maintain it effectively within the bowl opening.

Absorbent

The insect repellant tape jointed to the underside of the tray or dining mat (FIGS. VIII and IX) is an absorbent strip material of natural or synthetic origin. This includes materials comprised of plant fibers such as cotton, wool or linen; cellulose-based products such as absorbent papers; natural and sponge rubber or slow-release plastics. However, regardless of origin, it is only necessary that said material be substantially inert and capable of absorbing from about 25–99% of its weight in water to be effective. In this connection, a preferred embodiment consists of using materials having a loose matted fiber construction sufficient to absorb from 70–90% of their weight in water.

In practice, the absorbent strip material is thoroughly saturated with a liquid insecticidal composition. This saturated material may vary from one-eighth to 1.5 inches in thickness and from one-quarter to 1.5 inches in width and, preferably, is precoated with a barrier which is impervious to the said insecticide. The barrier-side of this saturated strip is then given a coating of a pressure-sensitive adhesive. The thickness of said adhesive is not critical but, in general, it is preferred to limit same to about 1/10 to 1/20 the thickness of the absorbent material. If desired, the tape may then be coated with a thin resinous film of such thickness as will ensure prolonged vaporization in insecticidal amounts but which, nevertheless, will prevent wasteful volatilization.

The absorbents described in the two preceding paragraphs are not intended to be used solely as tape strip material (FIGS. VIII and IX). On the contrary, said materials also have application as absorbents for the trays of FIGS. I-V, VII and X. Furthermore, the insecticidal absorbents or cartridges envisioned for the trays of FIGS. II-IV are far broader in scope than the plant, paper and rubber materials described supra. One such class of absorbents are, for example, those porous mineral supports which are inert with regard to known insecticides. These include finely divided solids such as kaolin, diatomaceous earth, bentonite, pumice, attapulgite, dolomite, limestone, gypsum and any natural or artifically agglomerated porous mineral substance of a siliceous, aluminous, silico-aluminous, silico-calco-aluminous, silico-calcareous, calco-aluminous or calcareous nature.

The porosity of the natural or artificially agglomerated solid porous mineral support should be as great as possible so as to retain, by absorption, a large amount of active insecticidal material. For the same reason, the dimensions of the pores should be as small as possible, so that the capillary forces may apply a very great retaining action to the material and control more effectively the evaporation of the insecticide. Thus, for example, in a porous support of amosite-silica agglomerate, the said support may have a porosity of 68 percent and the pores may have an average dimension of 500 Angstrom units and a specific surface area of about 32 square meters per gram.

Insecticides

The insecticidal compositions which may be applied to the foregoing absorbents and which therefore constitute a part of this invention are those having a vapor pressure of about 0.001 mm. of mercury or greater at 25° C. Included among these are known insecticides which belong to the di-lower alkyl (di-halovinyl)phosphate class of compounds:

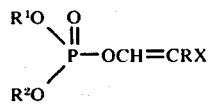

wherein R is hydrogen or halo such as chloro; X is halo such as chloro; and $R^1$ and $R^2$ are lower alkyl of 1–5 carbons as, for example, methyl, ethyl, propyl, butyl or amyl and the like. Preferred among these products is dimethyl(dichlorovinyl)phosphate, also known as DDVP.

Other applicable insecticides are 2–40% emulsions of the following products:

Chlordane: an octahydro-methano-tetrahydroindane emulsified in amounts of 3–5% in water (Dow Chemical Co.);

Dieldrin: a hexachloro-epoxy-octahydro-dimethanonaphthalene (Dow Chemical Co.);

Korlan: a dimethyl-trichlorophenyl-phophorothioate (Dow Chemical Co.).

Still other insecticides include Diazinon (Geigy Agricultural Chemicals), Lindane, Malathion (Dow Chemical Co.), Dicapthon and dichloro-diphenyl-trichloroethane.

To render the solid shaped absorbent and strip absorbent effective, they must be brought into contact with one or more of the foregoing compositions. Preferably, the solid or tape absorbent is passed through an emulsified form of the insecticide at a concentration of 3–20% and then dried in an oven at a temperature of from about 150°–180° C.

In practice, in lieu of a water emulsion, the insecticide is usually dissolved in an easily volatilizable substance such as a volatile hydrocarbon and, after saturation has been effected, the hydrocarbon is then removed by evaporation under heat.

Following the absorption of the insecticide, it may be desirable to treat the absorbent with a 5–10% solution of an oil such as silicone oil or with a wax so as to achieve a greater retention of the insecticidal composition than would otherwise be possible. Alternatively, to assure uniform and prolonged release of the insecticide, it may be desirable to coat the surface of the absorbent with a very thin layer of a permeable resin. This is achieved by passing the tape or solid shaped absorbent through a light resinous solution such as a vinyl resin or polyethylene resin to form a thin coating on the surface and side edges of the said material.

Once the absorbent has been saturated, it is dried at room temperature or as stated above, at a temperature of 150°–180° F. Finally, the absorbent is passed through a powdered material such as pyrethrum to effect a more complete drying. And if the tape is to be surface dried by a powder, it is passed, preferably, through a powder mixture such as talcum powder containing from 1–5% of the insecticide in powder form.

In the case of the tape material, once it has been formed, it is roller-coated or sprayed on its barrier side with a varnish or resinous material so as to prevent little or no escape of insecticide. The preferred resinous materials which act as barriers are the epoxy resins and phenol formaldehyde resins inasmuch as they are flexible when applied in a thickness of from about one-tenth to one-half inch.

As a final operation, the barrier side of the tape strip is coated with a synthetic or natural rubber adhesive coating. This coating may consist of a single layer of a liquid composition which is five parts rubber, two parts natural or synthetic resin such as rosin or cumarone resin and one-half to one part by weight of a dry inert powder such as whiting or zinc oxide in a finely divided and easily dispersible form.

It is an important feature of this invention to prevent any destruction of the adhesive or rubber base by which the tape strip is made to adhere to the underside of said tray. As indicated above, this is achieved by applying a relatively heavy barrier of a flexible resin or varnish coating between the tape or paper carrier and the pressure sensitive adhesive.

Finally, and if desired, the edges of the tape may be sealed together by pressure rollers so that the release of insecticidal vapors will be possible only in the central portion of the tape opposite the adhesive side and, for packaging purposes, a sheet of waxed paper or other suitably treated material may be applied to the surface of the tape to prevent any adherence between the adhesive and the surface of the insecticidal absorbent.

By protecting the absorbents in the manner just indicated it is possible to avoid causing any sensitivity or irritability to the skin of the user or to anyone who may be handling the tape in shipping, merchandising or retailing. However, when the tape is applied, the slow release through the silicone, vinyl or polyethylene coating will permit most satisfactory insect repellent properties over a period of several months. Usually, in the case of the tape strip, the pressure sensitive adhesive coating will become ineffective as an adhesive before the residual effect of the insecticide is lost.

Embodiments

In essence, this invention relates to an animal feed tray, feed mat or feed bowl which, in addition to serving as a receptacle for the feed, contains an insecticidal element consisting of an absorbent material impregnated with an insecticide and capable of emitting insecticidal vapors.

More particularly, this invention relates to a feed device in which the absorbent material is housed beneath the feed tray or feed bowl or beneath the surface of the feed mat.

According to one embodiment of this invention, the feed device is a feed tray in which the absorbent material is a tape strip which adheres to the underside of said tray and affords a sustained release of insecticidal vapors.

According to still another embodiment, the tape strip is made to adhere to the underside of said tray by an adhesive sacking and the strip is comprised of an absorbent material which is natural or synthetic in origin.

Preferably, the absorbent material of the tape strip is composed essentially of cotton, wool, paper or sponge rubber and is capable of absorbing from about 25–99% of its weight in water.

Alternatively, the absorbent may consist of a solid-shaped porous material which is housed within a perforated container or cartridge beneath the said feed bowl or feed tray where it is supported by friction between indented supports which accommodate the said cartridge. Pumice is an example of one such material.

In addition, the solid-shaped porous absorbent can be supported beneath the tray by frictional means as, for example, by sliding the absorbent between indented supports which are constructed and positioned in such a manner as to accommodate the absorbent.

In still another embodiment, the solid-shaped porous absorbent is maintained beneath the feed bowl by means of a protrusion (bonded to the underside of said bowl) which passes through an accommodating opening in the absorbent. Illustrative of such an absorbent is pumice.

Still another embodiment of this invention consists of a feed mat in which the absorbent material is a spongeous element impregnated with insecticide and sandwiched between a lower base element and an upper cover element, both of which are impervious to the said insecticide. Sponge rubber is typical of one such absorbent.

An especially preferred embodiment of this invention relates to a feed tray in which the frame thereof is constructed of wrought iron, i.e., metal stripping. In this embodiment, a continuous rectangular strip is rounded at each of its four corners and maintained above ground level by legs joined to each of said corners. In addition, the tray consists of two adjacent bowl openings defined by metal stripping and located within the perimeter and on the same plane as the continuous rectangular strip; two bowls which fit the accommodating bowl openings; a cartridge holder located between the adjacent bowl openings and held there by a brace which joins the said holder to the continous rectangular strip and an insecticidal element which fits the accommodating holder.

In the said feed tray, the insecticidal element is a two-piece container consisting essentially of a top cover and a preferred bottom receptacle which encloses an insecticidal cartridge.

The following examples serve to illustrate this invention and are not submitted by way of limitation. Any substitution of an equivalent material and any obvious modification in construction is considered as being within the scope of the artisan to effect and, therefore, as within the scope of this invention.

EXAMPLE 1

A cotton strip measuring one inch in width, 1/4 inch in thickness and composed of cotton, is treated with an emulsified form of the following insecticidal composition:

| Active Ingredients: | Percent |
|---|---|
| 0,0-Dimethyl-(2,2-dichlorovinyl)phosphate DDVP | 0.50 |
| Dieldrin | 0.50 |
| Petroleum Distillates | 96.50 |
| Inert Ingredients | 2.50 |

The cotton strip thus impregnated is then passed through a solution of vinyl resin so as to form a thin coating on the surface of the said strip and the resulting material is dried in an oven at approximately 170° F. for three hours and then passed through powdered pyrethrum.

The strip material thus obtained is then sprayed with varnish on one side to afford an effective barrier against the insecticide. The material is then dried at room temperature for eight hours or until tackfree and the barrier or sprayed side of the material is then coated with a single layer of a natural rubber adhesive having the following composition: five parts rubber, two parts rosin and one part zinc oxide in a finely divided, dispersible form.

The resulting tape strip is cut to the desired lengths and applied to the underside of the tray depicted in FIGS. VIII and IX. A tray so protected will effectively kill or repel the following insects: roaches, waterbugs, crickets, centipedes, ants, clover mites, spring tails, lice, box elder bugs, sow bugs, flies, mosquitoes, gnats, wasps, moths, mud dabbers, scorpions, spiders, silverfish, fire brats, carpet beetles and dog ticks.

EXAMPLE 2

By substituting one of the following compositions for the insecticidal formulation of Example 1 and otherwise following the procedure described therein, there are thus obtained other trays of varying effectiveness against certain insects.

| I. Active Ingredients: | Percent |
| --- | --- |
| Dichloro-diphenyl-trichlorethane | 5.0 |
| Methylated naphthalenes | 8.5 |
| Beta-butoxy, beta-thiocyanodiethyl ether | 1.0 |
| Essential oils | 0.5 |
| Petroleum distillates | 85.0 |

In lieu of the cotton strip described in Example I this composition, in emulsified form, was absorbed onto a ¾ inch wide and ⅝ inch thick, non-calendered paper of loose matted fiber construction capable of absorbing 85% of its weight in water.

| II. Active Ingredients: | Percent |
| --- | --- |
| 0,0 Diethyl-0-(2-isopropyl-4-methyl-6-pyrimidinyl) phosphorothioate | 00.50 |
| Pyrethrins | 00.08 |
| N-Octyl bicycloheptene dicarboximide | 00.25 |
| Technical piperonyl butoxide | 00.15 |
| Petroleum distillates | 74.02 |
| Inert Ingredients: | Percent |
| Propellant | 25.00 |

In lieu of the cotton strip described in Example 1 this composition, in emulsified form, was absorbed onto 1 ¼ inch wide and ¾ inch thick woolen strips.

| III. Active Ingredients: | Percent |
| --- | --- |
| 0,0-Diethyl-0-(2-isopropyl-6-methyl-4-pyrimidyn) thiophosphate | 0.100 |
| Pyrethrins | 0.100 |
| Technical piperonyl butoxide | 0.250 |
| Butoxide | 0.250 |
| Petroleum distillates | 96.150 |
| Inert Ingredients: | |
| Propellant | 3.0 |
| Equivalent to (butyl carbityl) (6-propyl piperonyl) ether and 0.05% of related compounds | 0.20 |

This material will kill or repel roaches, water bugs, ants, silverfish and the like.

| IV. Active Ingredients: | Percent |
| --- | --- |
| 0,0-Dimethyl-0,2,2-dichlorvinyl phosphate | 0.186 |
| Related compounds | 0.014 |
| Dieldrin | 0.300 |
| Petroleum distillates | 96.500 |
| Inert Ingredients | 3.000 |

This formulation is effective against roaches, waterbugs, crickets, centipedes, ants, clover mites, spring tails, book lice, box elder bugs, sow bugs, flies, mosquitoes, gnats, wasps, flying moths, scorpions, spiders, silverfish, fire brats, carpet beetles and dog ticks.

| V. Active Ingredients: | Percent |
| --- | --- |
| Pyrethrins | 0.037 |
| N-Octyl bicycloheptene dicarboximide | 0.150 |
| 0,0-Diethyl-0-(2-isopropyl-4-methyl-6-pyrimidinyl)phosphorothioate | 0.500 |
| Petroleum distillates | 96.313 |
| Inert Ingredients: | & Percent |
| Propellant | 3.000 |

This formula is effective against indoor and outdoor ants, roaches and insects.

EXAMPLE 3

A sheet of amosite-silica containing 3.5 percent by weight of amosite and 65% by weight of calcium silicate is substituted for the pumice stone of Example 1 and the procedure of that example is otherwise followed. The amosite-silica contains approximately 133 square centimeters of surface area, weighs 36.42 grams and has the shape of the insecticidal cartridge depicted in FIG. III. The essential attributes of this cartridge are as follows:

| | |
| --- | --- |
| Porosity | 68% |
| Mean dimension of pores | ±500A |
| Surface area | 32 square cm./gram |

As in Example 1 the cartridge is dried at 100° C for 5 hours, cooled in a dessicator to ambient temperature and weighed and immersed in DDVP for 25 minutes. After draining, the cartridge is weighed again and the amount of DDVP absorbed is calculated. The impregnated cartridge is found to contain 28.99 grams of DDVP or 44.3 percent by weight.

The impregnated cartridge thus obtained is suitable for use with the tray of FIGS. III and IV. In determining the effectiveness of this cartridge for loss of insecticide due to volatilization the procedure of Example 4 is used: the impregnated cartridge is suspended in a room exposed to variations of relative humidity (60–75 percent relative humidity) and of temperature (20°–25° C) in order to simulate the conditions of practical use and the block is weighed every seven days in order to determine the loss of DDVP. The results are as follows:

| Loss of DDVP | |
| --- | --- |
| Time Frame | Grams |
| After 7 days | 1.47 |
| From 8th to 14th day | 1.21 |
| From 15th to 21st day | 0.7 |
| From 22nd to 28th day | 0.7 |

EXAMPLE 4

A natural block of pumic stone is shaped to fit snugly between the indents (4) in FIG. II. The resulting block has the dimensions 12.3 × 2 × 2 cm., that is, a total surface area of approximately 106 square centimeters; its porosity is 35%, the means dimensions of its pores is 740 Angstrom units and its calculated specific surface is one square meter per gram.

The block is dried at 100° C for 5 hours, cooled in a dessicator to ambient temperature, weighed (57 grams) and immersed for 25 minutes in DDVP. After draining, the block is weighed again and found to have absorbed 24.3 grams of insecticide, that is, the impregnated block contains 29.8 percent by weight of DDVP.

When used as the solid shaped-absorbent in the tray of FIG. II there is a sustained kill and repellant effect against ants, flies, silverfish and dog ticks. The effectiveness of said block is determined as follows:

The impregnated block is suspended in a room exposed to variations of relative humidity (60–75% relative humidity) and temperature (20°–25° C) so as to simulate the conditions of actual use. The block is weighed every seven days to determine the loss of DDVP due to volatilization.

| Loss of DDVP | |
| --- | --- |
| Time Frame | Grams |
| After 7 days | 1.76 |
| From the 8th to 14th day | 1.08 |
| From the 15th to 21st day | 1.83 |
| From the 22nd to 28th day | 1.74 |

EXAMPLE 5

A sponge rubber mat one foot by one and one-half feet by one inch is saturated with the insecticidal composition (DDVP) described in Example 1. The impregnated mat is then treated on top and bottom with polyethylene resin so as to form a thin coating on the two surfaces and the resulting material is dried in an oven at approximately 160° F for 3.5 hours.

The resulting mat is then passed through powdered pyrethrum and sprayed with phenol-formaldehyde resin on both top and bottom, i.e., on both of the resin-treated sides, so as to form an effective barrier against the insecticide. The mat is then dried at room temperature for seven hours and the top and bottom of said mat is then coated with natural rubber. The resulting mat, corresponding to FIG. X, will effectively kill or repel the insects set forth in Example 1 for several weeks.

EXAMPLE 6

A natural block of pumice of the type shown in FIG. XIII is designed to fit protrusion 27 in the bowl of FIG. XII. The said block measures three inches by three inches square is approximately one-half inch in thickness and contains an aperture (26) having a ½ inch diameter.

The block is dried at 110° C for 6 hours, is cooled in a dessicator to ambient temperature and then immersed in DDVP for 30 minutes. After draining for 35 minutes, the block is weighed again and found to have absorbed 25 grams of insecticide.

When used as the cartridge in the tray of FIG. XII the said impregnated cartridge effects a sustained kill and repellant effect against ants, dog ticks, flies and silverfish.

EXAMPLE 7

Natural pumice in the form of a cylinder measuring one and three-quarter inches in diameter by ½ inch in thickness is dried in an oven at a constant temperature of 105° C. for 8 hours. The dried cyclinder is then placed in a dessicator at room temperature where it is allowed to remain overnight.

The following day, the cylinder is removed from the dessicator and is immersed in a solution of DDVP for 1 hour. The cylinder is then drained for 30 minutes to remove excess DDVP and weighed. The cylinder is found to have absorbed about 12.0 g. of the insecticide.

The impregnated cylinder is used directly by placing it in the container of FIG. XVIII (37 and 39) for use in the feed tray of FIG. XV. Thus employed, the cylinder is effective in repelling ants, dog ticks, flies and silverfish from the immediate area of the tray over a three week period.

Alternatively, instead of using the impregnated cylinder immediately in the tray (FIG. XV) is can be wrapped in foil, plastic or a wax treated paper and stored for future use. Thus wrapped, the impregnated cylinder has a shelf life of about 6 months.

What is claimed is:

1. An animal feed device having an upperside and an underside and support structure for forming an open area beneath said underside; said upperside providing one or more receptacles for feed; and including an insecticidal element held beneath the upperside and consisting essentially of an absorbent material impregnated with an insecticide means for emitting insecticidal vapors substantially throughout the entire open area.

2. The feed device of claim 1 in which the absorbent material is a tape strip which adheres to the underside of said device and which affords a sustained release of insecticidal vapors.

3. The feed device of claim 2 in which the tape strip is made to adhere to the underside of said device by an adhesive and in which the said strip is an absorbent material of natural or synthetic origin.

4. The feed device of claim 3 in which the absorbent material is composed essentially of cottom and is capable of absorbing from about 25–99% of its weight in water.

5. The feed device of claim 3 in which the absorbent material is composed essentially of wool and is capable of absorbing from about 25–99% of its weight in water.

6. The feed device of claim 3 in which the absorbent material is composed essentially of paper and is capable of absorbing from about 25–99% of its weight in water.

7. The feed device of claim 3 in which the absorbent material is composed essentially of sponge rubber and is capable of absorbing from about 25–99% of its weight in water.

8. The feed device of claim 1 in which said device is supported by a plurality of legs between which the insecticidal element is held as an absorbent tape to the underside of said device by a pressure sensitive adhesive.

9. The feed device of claim 1 in which the absorbent material is a solid-shaped porous element which is housed within the perforated cartridge beneath said device.

10. The feed device of claim 1 in which the insecticidal element consists essentially of an absorbent material impregnated with insecticide and sandwiched between a base and cover impervious to said insecticide.

11. The feed device of claim 10 in which the absorbent material is comprised of sponge rubber.

12. The feed device of claim 1 in which the support structure consists essentially of a plurality of legs and the absorbent material is a solid impregnated with insecticide.

13. The feed device of claim 12 in which the absorbent material is comprised of pumice and is maintained beneath said tray by a protrusion which passes through an aperture in said absorbent material.

14. The feed device of claim 1 in which the insecticide is a compound of the formula:

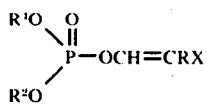

wherein R is hydrogen or halo; $R^1$ and $R^2$ are lower alkyl and X is halo.

15. The feed device of claim 1 in which the insecticide is dimethyl-2,2-(dichlorovinyl)phosphate.

16. The feed device of claim 1 in which the absorbent material is a solid-shaped porous element which is there supported by friction between indented supports.

17. An animal feed device having an upperside and an underside and support structure for forming an open area beneath said underside; said upperside providing one or more receptacles for feed, said support structure consists essentially of a continuous rectangular strip rounded at each of its four corners and maintained above ground level by legs adjoined to each of said corners and providing two adjacent bowl-openings defined by metal stripping located within the perimeter and on the same plane as the continuous rectangular strip; said receptacles consisting essentially of two bowls which fit the said bowl-openings; an insecticidal element held to the support structure between the adjacent bowl-openings by a brace which is joined directly to the metal stripping; said insecticidal element consisting essentially of an absorbent material impregnated with an insecticide means for emitting insecticidal vapors substantially throughout the entire open area.

18. The feed device of claim 17 wherein the insecticidal element is a two-piece container consisting essentially of a perforated top cover and a perforated bottom receptacle which encloses the absorbent material impregnated with insecticide.

* * * * *